May 26, 1931.  G. A. WALTER  1,807,263
APPARATUS FOR DISSOLVING SOLIDS
Filed Dec. 1, 1928

Inventor
GEORGE A. WALTER
By Semmes & Semmes
Attorneys

Patented May 26, 1931

1,807,263

UNITED STATES PATENT OFFICE

GEORGE A. WALTER, OF ITHACA, NEW YORK

APPARATUS FOR DISSOLVING SOLIDS

Application filed December 1, 1928. Serial No. 323,175.

This invention relates generally to dissolution and more particularly has reference to the dissolution of solids in solvents by diffusion.

It has been determined that the velocity of dissolution is dependent upon several factors, the principal ones which are, the physical condition or nature of the matter to be dissolved, temperature, the concentration of the solution formed, velocity of diffusion, and the rate of change of relative position between particles of solid matter and the liquid solvent in contact therewith.

The process of dissolution apparently takes place in several steps. First there is a reaction between the solid and the solvent in immediate contact therewith. The next step appears to be the diffusion of the products of the first dissolution reaction into the unsaturated or less concentrated solvent. It appears that if the solid is left in contact with the major portion of the solvent, that very thin films of the solvent surround the particles of the material to be dissolved and that there is a diffusion of these films after being saturated with a dissolved solid, into the unsaturated solvent.

If the process of dissolution is allowed to continue without setting up any artificial currents to aid the diffusion of the concentrated film in direct contact with the solid, it will become highly concentrated and the speed of dissolution of solids therein, will be very greatly reduced. However, if the concentrated film is diffused into the unsaturated solvent by some means of producing artificial currents, such as agitation, this film will become diluted and the rate of dissolution of the solids in the film will increase.

Several methods have been developed for increasing the rate of dissolution of solids in solvents, such as by artificial agitation. One particular form of apparatus developed for carrying out the above method is the paddle agitator, that is paddles are set up in tank structures in such a manner that when in operation strong currents will flow in the tank and will carry the solid matter in suspension in the solvent. Other types of apparatus for accomplishing a similar result are agitators of the propeller type and those in which air is blown through a solution to cause agitation.

In some instances the dissolution phenomena is facilitated by the use of heat to raise the temperature of the solvent and thereby increase the solubility of the solid. There are, however, certain instances where the solubility of solids decreases upon heating. In other cases, however, such as with common salt (sodium chloride) the solubility is only very slightly affected by change in temperature. An idea as to the difference in the solubility of sodium chloride with the change in temperature may be had from the following table:

*Grams of Na. Cl. per 100 c. c. of water*

| 0° C. | 20° C. | 100° C. |
|---|---|---|
| *Grams* 35.7 | *Grams* 36.0 | *Grams* 39.8 |

From this table it will be realized that in the case of dissolving sodium chloride in water, it would be highly uneconomical to resort to the use of heat.

With most of the apparatus heretofore used for dissolving solids in liquids, there has been the disadvantage that they require a rather large expenditure of power either for artificial agitation or for heat, which materially increases the cost of operation An object of this invention is to devise a method of effecting the dissolution of solid material in solvents by causing the solvent to flow through a mass of finely divided solid material.

Another object of this invention is to devise an apparatus in which the dissolution of solid material in solvents can be effected without the use of any mechanical or other form of agitating mechanism involving the expenditure of power.

Still another object of this invention is to devise an apparatus for effecting the dissolution of solid material in liquids without the use of heat.

A still further object of this invention is to devise an apparatus for dissolving solids in liquids which is simple in construction and operation and which can be very economically operated.

With these and other objects in view which may be incident to my improvements, the invention consists in the methods, parts and combinations to be hereinafter set forth and claimed, with the understanding that the several necessary elements comprising my invention, may be varied in construction, proportions and arrangement, and that the several steps may be varied without departing from the spirit and scope of the appended claim.

This invention in its broadest aspect comprises a tank structure having a cylindrical upper portion and a conical lower portion. The vertex of the lower portion is provided with an outlet to permit the entire contents of the tank to be discharged at will. Extending into the side of the conical portion adjacent the vertex is a conduit for supplying a solvent to the tank. Mounted over the nozzle portion of this conduit is a baffle structure which prevents the fluid flowing through the conduit, from passing directly up through the tank. This baffle serves to equally distribute the solvent and causes it is flow up through the material in the tank in such a manner as to contact with a large portion of the material to be dissolved. The upper portion of the tank is provided with an outlet conduit for drawing off a solution of solid material in the solvent introduced through the aforementioned conduit.

In operation, solid material which is desired to be dissolved is placed in the lower portion of the conical tank. Solvent is allowed to flow through the conduit and be distributed throughout the solid material. As the solvent flows up through the material a certain amount of the solid passes into the solution. The solution formed is displaced upwardly by a continuous flow of unsaturated solvent into the lower portion of the tank, and the solution may be drawn off as desired through a suitable discharge valve located in the upper portion of the tank.

In order to make my invention more clearly understood, I have shown in the accompanying drawings means for carrying the same into practical effect, without limiting the improvements in their useful applications to the particular constructions, which, for the purpose of explanation, have been made the subject of illustration.

Figure 1:
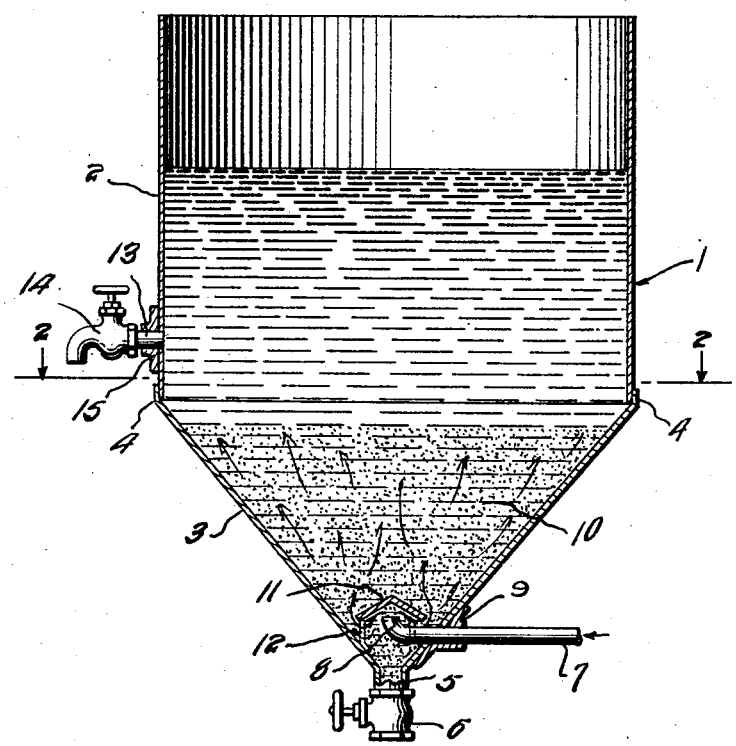
Figure 1 is a vertical sectional view of a tank constructed in accordance with my invention.
Figure 2:
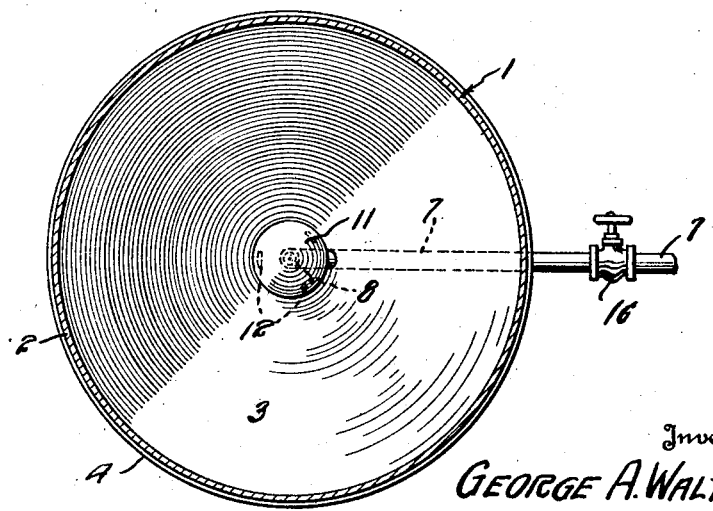
Figure 2 is a horizontal sectional view of the tank taken on line 2—2 of Fig. 1.

Referring to the drawings there is shown in Fig. 1 a tank 1 constructed in accordance with my invention. This tank constitutes the dissolving apparatus, and consists of an upper cylindrical section 1 and a lower hopper-like conical shaped section 3. Each of the sections may be formed separately and joined together as indicated at 4, or when the size permits, both sections can be formed integrally with each other.

It will be observed from an inspection of Fig. 1 that the lower or vertex portion of the conical section of the tank is provided with an extension 5 in the form of a conduit. Threadedly or otherwise mounted on the end of this extension is a suitable control valve 6. The extension 5 and the valve 6 provide means which may be operated when desired to discharge the entire contents of the tank or any sludge or insoluble material which may collect in the lower portion of the tank 1.

Extending through the conical wall of the section 3, adjacent the vertex, is a solvent supply conduit 7, by means of which the liquid solvent used in the dissolution process is introduced into the dissolving apparatus. A suitable valve 16 for controlling the flow of liquid solvent through pipe 7 may be placed therein adjacent the tank 1, if found necessary, but the flow can be properly controlled from a relatively remote point, not shown, if so desired.

The conduit 7 is provided interiorly of the tank 1 with an elbow 8, the free end of which is directed upwardly and is so positioned that its axis coincides with the axis of the cylindrical tank. This construction provides for equal distribution of solvent in the tank. As shown in Fig. 1, the portion of the conical section through which the conduit 7 extends is reenforced by a member 9. This reenforcing member serves to prevent the free end of the elbow 8 being displaced from its concentric position in the tank as may easily occur if the material of which the tank is constructed is relatively thin.

In order to prevent the fluid emerging from elbow 8, flowing directly up through the solid material 10, in an undivided stream, a distributing baffle 11 is mounted axially of the tank and directly over the outlet end of elbow 8. This baffle member is retained in its proper position against the action of fluid flow and the weight of solid material by means of the supporting brackets 12 which are connected to the walls of the conical section 3.

With the baffle 11 mounted over the outlet of the solvent supply pipe the stream of solvent is spread into a thin annular sheet which may be easily broken up into fine streams upon contacting with the material to be dissolved and thus be prevented from short circuiting through the material in one continuous stream.

At any desired location in the cylindrical wall of the upper section 2 there is located an outlet conduit 13 for the solution formed by the solvent flowing up through the material to be dissolved. This conduit may be provided with a bibcock 14, or any other type of valvular device for controlling the outflow of the solution from tank 1. A suitable reenforcing member 15 is provided to properly support the conduit 13 in the wall of the tank.

A cover member may be provided for closing the top of the tank, but ordinarily it is not essential to the proper operation of the dissolving apparatus.

In operation solid material such as common salt, is placed in the lower portion of the tank 1. Any amount of solid material may be placed in the tank provided its upper level is below the level of the solution outlet conduit so that none of the solid material will be carried off in the solution.

After the solid material is deposited in the tank, the valve 16 is cracked to allow the solvent to flow through the conduit 7 into the tank. As the solvent contacts with the solid, the latter passes into solution in a thin film about the solid particles. The film of solution about the solid particles is gradually displaced by the unsaturated solvent entering through conduit 7. In the course of time, the level of the solution will reach a point where it may be drawn out of the tank through the valve controlled conduit 13. As the solution is drawn off, the fresh, unsaturated solvent is introduced which creates an upward flow and assists the diffusion of the solution films about the solid particles into the unsaturated solvent. Thus, as long as the solvent is introduced, there will be upwardly flowing currents produced.

To vary the concentration of the solution produced, it is merely necessary to vary the rate of flow of the solvent into the tank. For instance, if highly concentrated solutions are desired, the flow of solvent will be very slow, whereas, if dilute solutions are desired, the rate of flow of the solvent will be increased.

As portions of the solid material are dissolved, the solid mass will become smaller and smaller and will pack down into the vertex of the conical lower section of the tank. This action brought about by the construction of the tank insures intimate contact between the unsaturated solution and the solid material.

It is obvious that the construction of the dissolving apparatus lends itself to continuous operation. Solid material may be either intermittently or continuously introduced into the dissolving apparatus while the solution is being withdrawn and while unsaturated solvent is continuously introduced. Such operation is particularly desirable in certain fields of industry.

After a long period of operation, particularly if the solid material contains insoluble matter, a sludge will collect in the tank. This may be easily removed by opening the drain valve 6 through which the entire contents of the tank may be discharged.

Although my invention is applicable to the dissolution of any soluble material in solvents, it has characteristics which are particularly desirable in the dissolution of common salt (sodium chloride) in water. It is of particular advantage in this specific instance, as in other instances, since it provides for the economical dissolution of salt at a minimum operating cost.

It will be appreciated that this invention has many advantageous features over the types of similar apparatus employing power either in the form of mechanical energy or heat for effecting the dissolution of solids in solvents. Also, the apparatus employed in carrying out this invention is simple in construction and may be easily cleaned and repaired.

While this invention primarily relates to the dissolution of solids in liquids without the aid of heat, I wish it to be clear that if it should be found advantageous, the solvent may be heated prior to introduction into the dissolving apparatus.

While I have shown and described the preferred embodiment of my invention, I wish it to be understood that I do not confine myself to the precise details of construction, or to the particular method steps, herein set forth, by way of illustration, as it is apparent that many changes and variations may be made therein, by those skilled in the art, without departing from the spirit of the invention, or exceeding the scope of the appended claim.

I claim:

An apparatus for forming solutions of soluble salts in water comprising a tank structure having an upper cylindrical section and a lower conical section, said cylindrical section adapted to contain the soluble salts in solution and said conical section adapted to contain the soluble salts to be dissolved, a conduit extending into said conical section adjacent the vertex thereof adapted to convey the water into said tank, means for retaining said conduit in a fixed position, a conical shaped baffle mounted over the outlet of said conduit adapted to distribute the water flowing through the conduit evenly throughout the material to be dissolved and prevent the sludge from clogging the inlet conduit, a conduit extension depending from the vertex of the conical section and adapted to discharge material from said tank, a valve attached to said conduit extension for controlling the flow of material from the lower conical section, a conduit extension in the upper cylindrical section for removing the solution of soluble salts in the water, means for controlling the flow of solution, and means for retaining the last mentioned conduit in a fixed position.

In testimony whereof I affix my signature.

GEORGE A. WALTER.